BISTABLE MULTIVIBRATOR EMPLOYING PNPN SWITCHING DIODES

Filed July 2, 1959

INVENTORS
Clarence S. Jones
Frank P. Lewandowski

BY Harvey G. Lamhurst
ATTORNEY 3,040,195
Patented June 19, 1962

3,040,195

BISTABLE MULTIVIBRATOR EMPLOYING PNPN SWITCHING DIODES

Clarence S. Jones, Los Altos, and Frank P. Lewandowski, Mountain View, Calif., assignors to General Precision, Inc., a corporation of Delaware Filed July 2, 1959, Ser. No. 824,649
8 Claims. (Cl. 307—88.5)

This invention relates to multivibrator circuits and, more particularly, to a trigger circuit having two stable states which is also known as a "T" flip-flop.

A wide variety of electronic control systems, such as are used for pulse generation, storage of information, counting, computing, etc., require a circuit having a single input line and which changes its state when a trigger pulse is applied thereto, but which remains in the same state otherwise. It is customary practice to employ a "T" flip-flop or trigger circuit for such electronic control systems. Although conventional trigger circuits provide fairly stabilized output signals, the utilization of these circuits is somewhat limited by the fact that the output impedance is high and that, therefore, only limited output power is available to drive, control or actuate further circuits. Additionally, conventional multivibrators usually require two electronic valves and a large number of additional components for proper operation, resulting in complex circuitry and bulky packages not readily miniaturized. Often, a number of the required components of prior art trigger circuits are temperature sensitive, causing a variation of operation with change of temperature by introducing irregularities in the character of the output signal such as distortion in the waveform or variation in the rise time of the leading edge of the output pulses.

It is therefore a primary object of the present invention to provide a bistable multivibrator or "T" flip-flop whose output impedance is substantially smaller than that obtainable from conventional trigger circuits.

It is another object of this invention to provide an improved bistable multivibrator whose operation is substantially independent of variations in temperature.

It is still another object of this invention to provide an improved bistable multivibrator requiring a substantially fewer number of components than conventional trigger circuits and, therefore, being especially adapted for miniaturization.

It is a further object of this invention to provide a simple bistable multivibrator circuit which utilizes a single electronic valve.

It is a still further object of this invention to provide an improved bistable multivibrator circuit which is simpler, smaller in size, less temperature sensitive, and more reliable than conventional trigger circuits.

Other objects and many of the attendant advantages of this invention will be readily appreciated as they become better understood by reference to the following detailed description when considered in connection with the accompanying drawings wherein.

Briefly, the present invention accomplishes a number of its objects by utilizing a two-terminal four-layer silicon PNPN semiconductor device (henceforth referred to as a PNPN diode) in each of two branch arms connecting a single current valve, such as a transistor, to a voltage supply furnishing the load current. The circuit is so constructed that only one of the PNPN diodes is conductive at any one time, the other diode being non-conductive. The conductive PNPN diode permits a large load current to flow through its associated branch arm and the current valve, and provides the desired output pulse (output signal) from a load impedance included in that branch arm. The circuit may be made to change its state by the application of a suitable trigger pulse to the current valve of sufficient magnitude to shut off the load current flow therethrough momentarily. Upon removal of the trigger pulse, the electronic valve once more resumes its conductive state, but now the two PNPN diodes exchange their respective conductive states, thereby causing current flow through the branch arm which was previously non-conductive. The two PNPN diodes utilized in this manner operate as current switches and are controlled by current flow through the current valve.

Figures 1, 4:
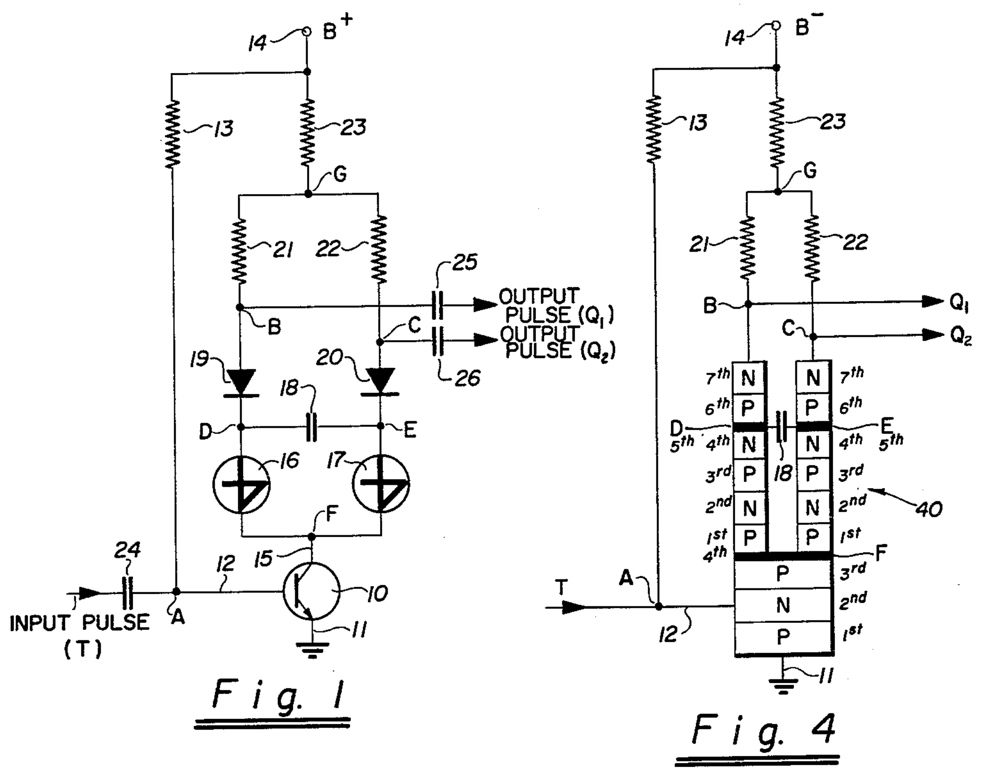
FIG. 1 is a schematic circuit diagram of a preferred embodiment of the bistable multivibrator of this invention.
FIG. 4 is a schematic circuit diagram of an alternate embodiment of the circuit of FIG. 1 modified to operate with positive trigger pulses and, further, showing the utilization of a compounded semiconductor device providing an electronic package of minimum size.

Referring now to the drawings, and particularly to FIG. 1 thereof, a current valve, such as transistor 10, has one of its main electrodes, such as emitter electrode 11, connected to a reference potential, such as ground. The control electrode, such as base electrode 12, has impressed thereon a suitable potential to provide a base current sufficiently large to keep transistor 10 fully saturated. In the preferred embodiment of FIG. 1, base electrode 12 is connected to the B+ voltage supply indicated generally by terminal 14 through a base biasing resistive impedance 13. Collector electrode 15 is connected to B+ voltage supply 14 through two parallel circuit branch arms joined to a common load impedance 23. Each branch arm includes a two-terminal four-layer silicon PNPN semiconductor diode 16, 17 serially connected to a conventional PN diode 19, 20 poled to permit current flow when current valve 10 is conductive, and further serially connected to branch load impedances 21, 22. The junction between PNPN diode 16 and PN diode 19, generally indicated as point D, and the junction between PNPN diode 17 and PN diode 20, generally indicated by point E, are connected through a capacitive impedance 18.

As will be explained in detail below, a negative input or trigger pulse for changing the state of the bistable multivibrator circuit of this invention may be applied, through an optional isolation capacitor 24, to base electrode 12 at point A. Similarly, the output signals $Q_1$ and $Q_2$ may be derived, via optional isolation capacitors 25 and 26, from points B and C respectively.

Diodes 16 and 17 are silicon four-layer switching diodes of the PNPN type and are two terminal devices. Devices such as diodes 16 and 17 are commonly referred to as four-layer PNPN diodes or simply as PNPN diodes and are described in an article entitled "The Four-Layer Diode" by W. Shockley in the August 1957 issue of Electronic Industries & Tele-Tech. Briefly, a PNPN diode operates in either of two states: an open or high impedance state of 1 to 100 megohms, and a closed or low-impedance state of less than 9 ohms. The PNPN diode is switched from one state to the other by voltage and current applied to the device. As the voltage is raised in the forward direction (that is the P-zone or anode is made positive with respect to the N-zone or cathode) the PNPN diode reaches a breakdown voltage and changes to the low-impedance or high-conductance condition, thereby closing the circuit between the two terminals (the anode and the cathode). The circuit remains closed as long as the required sustaining current $I_s$ is maintained. If the current falls below this value, the device resumes its open or high impedance condition. The turn-on time of a PNPN diode is usually less than 0.1 microsecond. A more detailed explanation of the PNPN diode may be found in Patent No. 2,855,524, issued October 7, 1958, to Shockley on Semiconductor Switch.

Figure 2:
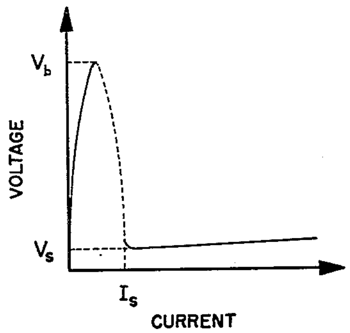
FIG. 2 is a graph showing the voltage-current characteristic of a two-terminal four-layer PNPN diode utilized in connection with the circuit of FIG. 1.

In FIG. 2 there is plotted the voltage appearing across the terminals (anode and cathode) of a PNPN diode, such as diode 16, against the magnitude of current flowing therethrough from point D to point F, FIG. 1. Low current flows, corresponding to the high-impedance condition of diode 16, until the breakdown voltage $V_b$ is reached. There then follows an unstable negative resistance region (indicated by a dotted line portion) in the voltage-current characteristic. Next, there follows a region in which, although the current flow is appreciable, only a small voltage appears across diode 16 corresponding to the low-impedance state of the diode. In this region, the major portion of the voltage applied (that is the $B^+$ voltage) is developed across cascaded resistors 23 and 21. After breakdown has been initiated, the breakdown condition will be sustained if there is maintained across diode 16 sufficient voltage to insure the flow of a sustaining current $I_s$. If the voltage applied is lowered beyond the value $V_s$, the sustaining voltage, diode 16 returns to its high-impedance state and remains in this state until the breakdown initiating voltage $V_b$ is again applied.

In the operation of the circuit of FIG. 1, initial application of $B^+$ voltage to terminal 14 causes points G, B, D, C and E to immediately rise to $B^+$ potential since initially neither of diodes 16 and 17 are conductive and, therefore, both branch arms are effectively open-circuited. The magnitude of $B^+$ potential is carefully selected to be greater than $V_b$ (the PNPN diode breakdown potential) so that both PNPN diodes 16 and 17 are momentarily exposed to a voltage large enough to cause breakdown. Only one of PNPN diodes 16 and 17 will break down and it is usually impossible to predict which one will become conductive first; but, as soon as one PNPN diode becomes conductive, say diode 16 breaks down first, current will flow from terminal 14, through common load resistor 23, through branch load resistor 21, through PN diode 19 and PNPN diode 16 into collector electrode 15 of transistor 10. Of course, as soon as current flow commences, the potential of point G will drop to a value depending on the relative resistive values of the common and the branch load impedances 23 and 21. If the resistive values of resistors 21 and 23 are selected as approximately equal, then junction G will drop to approximately one-half $B^+$ potential. Accordingly, points C and E also drop to one-half of $B^+$ potential which must be selected so that it is less than $V_b$, the breakdown potential of PNPN diode 17 and PNPN diode 17 remains non-conducting. The potential of points B and D, of course, drops close to the reference potential (ground) differing therefrom by the potential across the conducting semiconductive devices 16 and 19 which is usually very small. Since the potential at point D is substantially equal to the reference potential and the potential at point E is substantially equal to one-half $B^+$ potential, it is seen that capacitor 18 will be charged to one-half of $B^+$ potential. The steady state condition of the variously identified points is shown by the various curves to the left of time line $t_1$, FIG. 3.

At the time of the initial application of $B^+$ potential to terminal 14, current flow through base biasing resistor 13 commences and supplies sufficient base current to saturate transistor 10, permitting current flow from point F to emitter electrode 11. Upon application of a negative trigger pulse T at time $t_1$ through optional coupling capacitor 24, point A becomes negative, cutting off base current and isolating point F from emitter electrode 11. This, in turn, decreases current flow through conducting PNPN diode 16 and causes diode 16 to revert back to its stable state as soon as current flow therethrough falls below sustaining current. $I_s$. As soon as PNPN diode 16 becomes non-conducting, the potential of point D is raised to $B^+$ potential and, consequently, kicks up the potential at point E to three-half $B^+$ potential. Of course, point C will also rise, but only to $B^+$ potential and is not influenced by the potential at point E since the latter is separated from the former point by diode 20 which is now back-biased.

As soon as the trigger pulse is removed and transistor 10 becomes conductive once more, PNPN diode 17 will change to its quasi-stable state since the voltage across it is 50 percent higher than the voltage across diode 16 and, therefore, breakdown occurs faster. Once current flow commences through diode 17, the potential at point D drops to one-half of $B^+$ potential which is selected, as stated above, of magnitude less than $V_b$, the breakdown potential of the PNPN diode. From the above description it will be evident to those skilled in the art that a change of state of the circuit occurs each time after the application and removal of a negative voltage pulse to point A.

Figure 3:
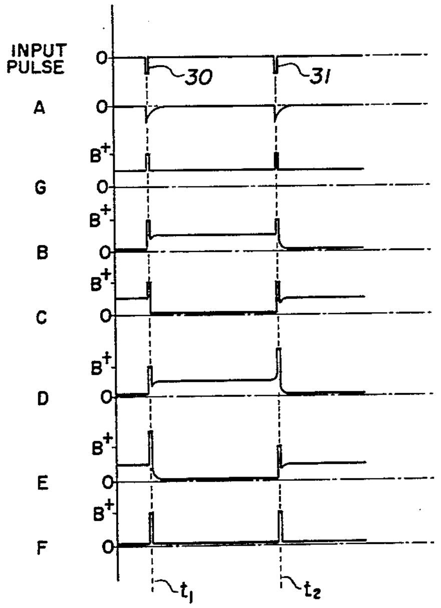
FIG. 3 is a chart showing the variations with time of the voltages at various identified points in the circuit of FIG. 1.

The operation of the circuit is graphically shown in FIG. 3 which illustrates the voltage-time relationship at the various identified points of the circuit. For example, upon application of a pulse 30 at time $t_1$, point A becomes negative, points B and D change from substantially zero potential before application of pulse 30, to $B^+$ potential during the application of pulse 30, to one-half $B^+$ potential after the application of pulse 30. At the same time, points C and E change from one-half $B^+$ potential before application of pulse 30, to $B^+$ and three-half $B^+$ potential respectively during the application of pulse 30, to substantially zero potential after application of pulse 30. Point F remains at substantially zero potential except during the application of pulse 30 when its potential rises to $B^+$ potential corresponding to the cutoff condition of transistor 10. Upon application of a further pulse 31 at a time $t_2$, the potential variations of points B and D are exchanged with those of C and E respectively.

In summary, it may be appreciated that the capacitor 18 is charged to approximately half the value of the $B^+$ voltage during each interval between pulses. The polarity of the charge on the capacitor 18 is dependent upon which of the diodes 16 or 17 is conducting, and we will assume, for example, that diode 16 is initially conducting while diode 17 is initially cut off. Under these conditions, the point D is substantially at ground potential while the point E is substantially at one half the $B^+$ voltage. Subsequently a pulse will render the valve 10 non-conductive and the voltage at the point D will rise and become equal to the $B^+$ voltage. Accordingly, the voltage at the point E will rise to three halves of the value of the $B^+$ voltage since the diode 20, being back-biased, will isolate the capacitor 18 such that the voltage retained thereacross is additively combined with the voltage at point D. After the pulse, the valve 10 will again conduct, and the diode 17 being biased to a higher voltage than the diode 16, will first break down and conduct and will thereby prevent conduction in the diode 16. Thus, when a pulse appears, the capacitor 18 functions to increase the bias applied to the initially non-conducting four-zone diode, and thereby causes a reversal of the conduction state of the flip-flop.

The following table sets forth circuit and component values which have been found to be perfectly satisfactory for the operation of the circuit of FIG. 1. These values are intended to be exemplary only and are not to be interpreted in a limiting sense.

| | |
|---|---|
| Transistor **10** | General Electric 2N169. |
| PN diodes **19** and **20** | Hughes 1N191. |
| PNPN diodes **16** and **17** | Beckman/Helipot 4N30D. |
| Resistors **21**, **22** and **23** | 1000 ohms. |
| Resistor **13** | 150 kiloohms. |
| Capacitor **18** | 270 micromicrofarads. |
| $B^+$ potential | 60 volts. |
| Trigger pulse | −10 volts. |

It is to be understood that transistor 10 is merely exemplary of a current valve and that an electronic tube might likewise be used in practicing this invention. A transistor has been selected for the embodiment of this invention shown in FIG. 1 because it is admirably suitable for practicing the invention, having a high current carrying capacity and requiring low voltages for proper operation.

The trigger circuit shown in FIG. 1 is suitable for operation with negative trigger pulses and utilizes an NPN transistor and a positive potential power supply referenced to the emitter electrode. As will be obvious to those skilled in the art, the circuit of FIG. 1 may be modified for operation with positive trigger pulses by replacing NPN transistor 10 with a PNP transistor, exchanging the anodes and cathodes of diodes 16, 17, 19 and 20, and substituting a negative potential power supply for the positive potential power supply. FIG. 4 shows such a modification and further shows the utilization of a different component arrangement utilizing a new and novel semiconductor device suitable to provide a flip-flop of minimum size. Such a component arrangement is equally applicable to the trigger circuit of FIG. 1 and, for the sake of simplicity, the same reference characters are used in FIG. 4 to designate like parts.

Referring now to FIG. 4, a compounded semiconductor device 40 comprises eighteen zones arranged to assume a shape similar to that of a tuning fork having a shank and two prongs. Of course, the shape is quite immaterial, and may, in general, be any bifurcated body. For the purpose of this description only, and not in any limiting sense, the first four zones may be the shank-zones and the remaining zones may be referred to as prong-zones, each prong comprising seven zones. More particularly, semiconductor device 40 comprises a P-zone, N-zone, P-zone and conductive-zone forming the shank and to which are connected two prongs. Each prong comprises a P-zone, N-zone, P-zone, N-zone, conductive-zone, P-zone and N-zone. The zones may be numbered from one to four for the shank and one to seven for each of the prongs.

The first and second zones of the shank are connected respectively to a reference potential such as ground and the base biasing resistor 13. The fifth zones of each prong is coupled to opposite sides of capacitor 18 and the seventh zones of each prong are respectively connected to branch load impedances 21 and 22. The operation of the circuit of FIG. 4 will be understood in view of the explanation given in connection with FIG. 1 so that further description is believed unnecessary. The conductive-zones of semiconductor 40 correspond to points D, E and F of the circuit of FIG. 1.

The circuit of FIG. 4 has a $B^-$ supply voltage impressed upon load impedance 23 and may be made to change its state by the application of a positive trigger pulse. Of course, a trigger circuit similar to the one shown in FIG. 4 may be provided which operates with a $B^+$ potential source and which may be triggered by the application of a negative trigger pulse. The semiconductive device for such a circuit is similar to the one shown in FIG. 4 except that all P-zones are exchanged for N-zones and vice versa.

An eighteen zone semiconductor device, such as the one shown in FIG. 4, can be manufactured to have physical dimensions of less than ¼ inch in length and less than ⅛ inch in diameter. Obviously a bistable multivibrator built in accordance with the teaching of this specification and including an eighteen-layer semiconductor device, has tremendous advantages over conventional circuits in that it makes possible a degree of miniaturization heretofore thought unobtainable. Furthermore, reliability and ruggedness are greatly increased and the number of components greatly reduced.

There has been described a bistable multivibrator circuit which may comprise silicon type semiconductor devices to achieve greatly increased temperature stability. Furthermore, the output impedance of the circuit of FIG. 1 is greatly reduced over that of conventional flip-flop devices. The number of components required for construction of the circuit of FIG. 1 is only 10 components; that is 1 transistor, 2 PN diodes, 2 PNPN diodes, 1 capacitor and 4 resistors. Or, if the circuit includes the eighteen-layer semiconductor device described in FIG. 4, the total number of components is reduced to 6; namely a compounded semiconductor body, 1 capacitor and 4 resistors.

Although there has been described an invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

What is claimed is:

1. A bistable multivibrator comprising: first and second PNPN switching diodes; first and second unidirectional conducting means serially connected to said first and second switching diodes respectively and defining therewith first and second circuit elements each having first and second terminals; a current valve having at least first, second and control electrodes, the first terminal of said first and second circuit elements being connected to said first electrode; first and second resistive impedances coupled to the second terminal of said first and second circuit elements respectively; a capacitive impedance connecting said first and second circuit elements; a third resistive impedance for coupling a source of voltage referenced to said second electrode to said first and second resistive impedances; and means for applying a biasing potential to said control electrode.

2. A bistable multivibrator comprising: first and second PNPN switching diodes; first and second unidirectional conducting means serially connected to said first and second switching diodes respectively and defining therewith first and second circuit elements each having first and second terminals; a current valve having at least first, second and control electrodes, the first terminal of said first and second circuit elements being connected to said first electrode; first and second resistive impedance means coupled to the second terminal of said first and second circuit elements respectively; a capacitive impedance means connecting said first and said second PNPN diodes; third and fourth resistive impedances; a source of voltage referenced to said second electrode having its output terminal connected to said first and second resistive impedance means through said third resistive impedance means and to said control electrode through said fourth resistive impedance means; and circuit means for applying a trigger to said control electrode.

3. A bistable multivibrator comprising: first and second PNPN switching diodes, each having first and second terminal electrodes; a capacitive impedance connecting the first terminal of said first and second PNPN switching diodes; a transistor having emitter, collector and base electrodes, said second terminal electrode of said first and second PNPN diodes being coupled to said collector electrode; a first load impedance; first PN diode means connected between said first load impedance and the first terminal of said first PNPN diode; a second load impedance; a second PN diode means connected between said second load impedance and the first terminal of said second PNPN diode; a common load impedance connected to said first and second load impedances; potential source means for applying biasing potentials to said common load impedance and to said base electrode; and circuit means coupled to said base electrode for applying trigger pulses which momentarily cut off said transistor.

4. A bistable multivibrator comprising: first and second semiconductor devices, each semiconductor device including at least a P-zone, N-zone, P-zone and N-zone in succession and having first and second terminal electrodes, each semiconductor device having a stable high-impedance state and a quasi-stable unidirectional low-impedance state, said quasi-stable low-impedance state being initiated with the voltage applied across said terminal electrodes exceeds a characteristic minimum voltage value and being maintained by said semiconductor device until the current flowing therethrough drops below a characteristic minimum current value; first and second unidirectional conducting means serially connected to the first terminal electrodes of said first and second semiconductor devices; a current valve having at least first, second and control electrodes, the second terminals of said first and second semiconductor devices being connected to the first electrode of said current valve; first and second resistive impedances coupled to said first and second unidirectional conducting means; a capacitive impedance connecting the first terminals of said first and second semiconductor devices; a third impedance means; a source of voltage referenced to the second electrode of said current valve having its output terminal connected to said first and second resistive impedances through said third impedance and providing a voltage in excess of said characteristic minimum voltage value; and biasing circuit means coupled to the control electrode of said current valve for keeping said current valve normally conductive, said biasing circuit means including input circuit means for applying a pulse making said valve momentarily non-conductive and thereby causing the current through each of said semiconductor devices to fall below said characteristic minimum current value.

5. A semiconductor body for use with a bistable multivibrator of bifurcated configuration having a shank portion and two prong portions, said shank portion comprising four zones in succession in which said first, second and third zones are semiconductive zones and the fourth zone is a conductive zone, and each of said prong portions being coupled to said conductive zone and comprising seven zones in succession in which the first, second, third, fourth, sixth and seventh zones are semiconductive-zones and the fifth zone is a conductive-zone, said semiconductor body having terminal electrodes coupled to the first and second zones of said shank portion and the fifth and seventh zones of each of said prong portions.

6. A semiconductor body in accordance with claim 5 wherein the first and third zones of said shank portion and the first, third and sixth zones of each of said prong portions are P-zones; and the second zone of said shank portion and the second, fourth and seventh zones of each of said prong portions are N-zones.

7. A semiconductor body in accordance with claim 5 wherein the second zone of said shank portion and the second, fourth, and seventh zones of each of said prong portions are P-zones; and the first and third zones of said shank portion and the first, third and sixth zones of each of said prong portions are N-zones.

8. A bistable multivibrator comprising: a first and a second PNPN diode; a two-zone diode connected in series with each PNPN diode; a biasing means; an impedance network coupled between each of the two-zone diodes and the biasing network, said impedance means being operable to pass a current to one of the PNPN diodes for sustaining conduction therein and being further operable to reduce the bias upon the other PNPN diode to prevent conduction; a capacitor connected between the respective series junctions of the PNPN diodes and the two-zone diodes; a normally conductive transistor connected in series with both PNPN diodes; means for passing pulses to the transistor for rendering said transistor intermittently non-conductive, said capacitor being operable to store a charge during intervals between pulses and thence to increase the bias upon an initially non-conductive PNPN diode when said transistor is non-conductive, said transistor forming a shank portion of a semiconductor body, and each PNPN diode together with the respective two-zone diodes forming individual prongs extending from the shank portion.

References Cited in the file of this patent

UNITED STATES PATENTS

| | | |
|---|---|---|
| 2,663,806 | Darlington | Dec. 22, 1952 |
| 2,856,544 | Ross | Oct. 14, 1958 |
| 2,910,634 | Rutz | Oct. 27, 1959 |
| 2,936,384 | White | May 10, 1960 |

OTHER REFERENCES

High-Speed Computers and article by Rapp published in a Digest of Technical Papers 11 to 12 by the Proc. IRE Prof. group of Circuit Theory at the 1958 Transistor and Solid-State Circuits Conference, Feb. 20 to 21, 1958.

The Four Layer Diode by Dr. Shockley, Electronics Industries, August 1957, pages 58–60, 161–165.